(12) United States Patent
Aga et al.

(10) Patent No.: US 10,253,754 B2
(45) Date of Patent: Apr. 9, 2019

(54) APPARATUS FOR WIND ENERGY PRODUCTION AND AIR PURIFICATION

(71) Applicant: Imam Abdulrahman Bin Faisal University, Dammam (SA)

(72) Inventors: Omer Aga, Dammam (SA); Ismail Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 148 days.

(21) Appl. No.: 15/606,752

(22) Filed: May 26, 2017

(65) Prior Publication Data
US 2018/0340513 A1 Nov. 29, 2018

(51) Int. Cl.
| | |
|---|---|
| *F03D 9/00* | (2016.01) |
| *F03D 3/02* | (2006.01) |
| *F03D 3/00* | (2006.01) |
| *F03D 3/06* | (2006.01) |
| *F03D 13/20* | (2016.01) |
| *F03D 9/25* | (2016.01) |
| *F01D 25/32* | (2006.01) |

(52) U.S. Cl.
CPC .............. *F03D 3/02* (2013.01); *F01D 25/32* (2013.01); *F03D 3/005* (2013.01); *F03D 3/062* (2013.01); *F03D 9/25* (2016.05); *F03D 13/20* (2016.05); *F05B 2240/211* (2013.01)

(58) Field of Classification Search
CPC ... F03D 3/00; F03D 3/06; F03D 3/061; F03D 3/062; F03D 9/25; F03D 9/255; F03D 9/257; F03D 80/85; D03D 3/005; F05B 2240/211; F05B 2240/96

USPC ........................................ 416/146 R; 290/55
See application file for complete search history.

(56) References Cited

U.S. PATENT DOCUMENTS

| | | | |
|---|---|---|---|
| 2004/0187450 A1 | 9/2004 | Kim et al. | |
| 2009/0196763 A1* | 8/2009 | Jones | ...................... F03D 3/005 |
| | | | 416/90 R |

(Continued)

FOREIGN PATENT DOCUMENTS

| | | |
|---|---|---|
| CN | 105146873 A | 12/2015 |
| CN | 105561719 A | 5/2016 |

OTHER PUBLICATIONS

Newwind R&D, "Newwind", URL: http://www.newwind.fr/en/newwind/, 4 Pages total, (Sep. 29, 2015).

*Primary Examiner* — Marguerite McMahon
(74) *Attorney, Agent, or Firm* — Oblon, McClelland, Maier & Neustadt, L.L.P.

(57) ABSTRACT

Described herein is an apparatus for wind energy production and air purification. The apparatus includes a vertically mounted center shaft, a plurality of branches connected horizontally to the center shaft along a length of the center shaft to faun different levels of branches, a plurality of blades rotatably connected to each branch of the plurality of branches, at least one of the blades being configured to hold one or more air filters, and a micro-turbine rotatably connected to each blade of the plurality of blades, wherein each blade of the plurality of blades is configured to rotate in response to air received at the plurality of blades thereby producing electric energy via rotation of the respective micro-turbines and the one or more air filters, the one or more air filters being configured to filter the air blowing at the plurality of blades.

19 Claims, 5 Drawing Sheets

(56) References Cited

U.S. PATENT DOCUMENTS

| | | | |
|---|---|---|---|
| 2010/0289269 A1* | 11/2010 | Christy | F03D 9/007 290/55 |
| 2012/0121416 A1* | 5/2012 | Sauer, Jr. | F03D 3/065 416/132 B |
| 2013/0328319 A1* | 12/2013 | Guo | F03D 1/04 290/55 |
| 2014/0021723 A1* | 1/2014 | Christy | F03D 9/007 290/55 |
| 2015/0108762 A1* | 4/2015 | Michaud-Lariviere | F03D 3/02 290/55 |
| 2018/0069442 A1* | 3/2018 | Ma | H02K 7/1838 |

* cited by examiner

APPARATUS FOR WIND ENERGY PRODUCTION AND AIR PURIFICATION

BACKGROUND

Generally, a windmill or a wind generator for generating electric energy using a naturally flowing wind includes a set of blades (also referred as wings or impeller) arranged in a fan-like pattern along a cap connected to a rotating shaft of a generator to produce electric energy. As the wind flows across the blades, the cap starts rotating and electric energy is produced.

The blades have an aerodynamic shape and connected to a tilting mechanism. The blades may he tilted based on the wind direction and wind speed during operation of the windmill to optimize the use of wind energy thereby increasing the efficiency of the windmill. Further, to start the operation of the windmill, the wind speed should be high, typically above 4 mph. Such aerodynamically shaped blades and the tilting mechanism can be complex and expensive to manufacture and maintain. Further, the windmills are difficult to installed and require specific environment at a high altitude. For example, windmills are typically installed in mountainous regions, where wind flows constantly at high speeds.

In some cases windmills may be connected to a blower to artificially produce the required wind speed, especially to start the operation of the windmill. As such, additional surplus electric power supply may be needed.

There remains a continuing need to provide improved windmills that can operate at low wind speed, are small in size, and are easy to install and maintain.

SUMMARY

According to an embodiment of the present disclosure, there is provided a wind energy production and air purification apparatus. The apparatus includes a vertically mounted center shaft, a plurality of branches connected horizontally to the center shaft along a length of the center shaft to form different levels of branches, a plurality of blades rotatably connected to each branch of the plurality of branches, at least one of the blades being configured to hold one or more air filters, and a micro-turbine rotatably connected to each blade of the plurality of blades, wherein each blade of the plurality of blades is configured to rotate in response to air received at the plurality of blades thereby producing electric energy via rotation of the respective micro-turbines and the one or more air filters, the one or more air filters being configured to filter the air blowing at the plurality of blades.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiments) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate, ""minor," and similar terms generally refer to ranges that include the identified value within a margin of 20%, 10% or preferably 5% in certain embodiments, and any values therebetween.

Figure 1:
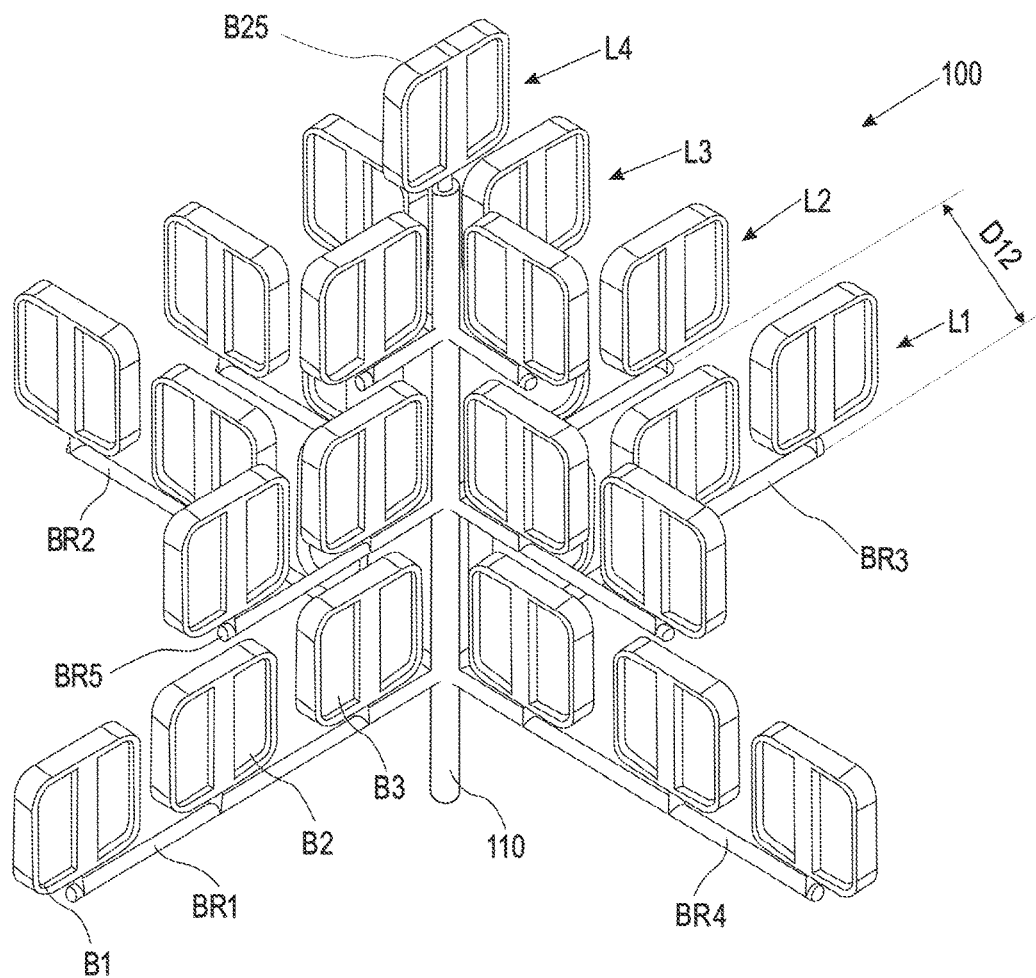
FIG. 1 illustrates an eco-tree apparatus according to an exemplary embodiment of the present disclosure.

FIG. 1 illustrates an eco-tree apparatus 100 (referred as eco-tree 100 hereinafter) according to an exemplary embodiment of the present disclosure. The eco-tree 100 can be a device having a tree-like structure that can convert a kinetic energy of wind (or air) into an electric energy while purifying the air passing through the eco-tree, for example, by absorbing harmful pollutants from the air such as inhalable and airborne particulate matters and volatile organic compounds.

The eco-tree 100 includes a center shaft 110, a plurality of branches (e.g., branches BR1, BR2, BR3, BR4), and a plurality of blades (e.g., B1, B2, B3, and B25). The plurality of blades are rotatably connected to the plurality of branches via micro-turbines (not illustrated) to convert the wind energy to the electric energy. According to an example of present disclosure, twenty-five blades are spread among the branches of different lengths to foiui the eco-tree 100. However, the present disclosure is not limited to the number of blades and branches.

Figure 2:
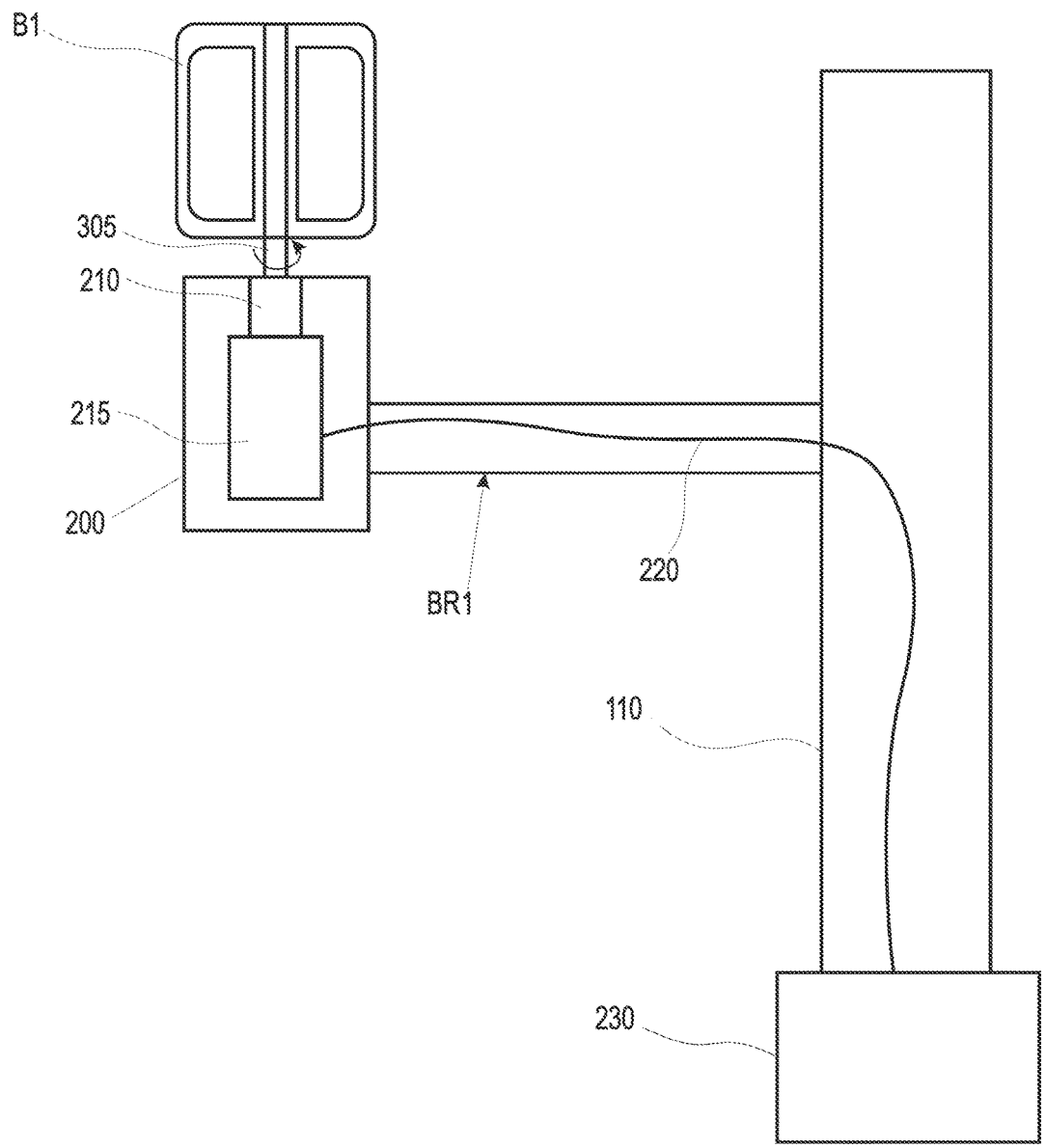
FIG. 2 is a cross-section of the eco-tree apparatus illustrating internal details according to an exemplary embodiment of the present disclosure.

The branches (e.g., branches BR1-BR4) can be hollow shafts that receive wires from micro-turbines and further pass the wires through the center shaft 110, as illustrated in FIG. 2. The plurality of branches (e.g., branches BR1-BR4) can he connected along the longitude of the center shaft 110. For example, branches BR1-BR4 are connected at a bottom, referred as a first level L1, of the center shaft 110. Similarly, additional branches can be connected to the center shaft 110 along its length at a second level L2, a third level L3, a fourth level L4, and so on. A distance D12 between the branches at the first level L1 and the branches at the second level L2 is such that the branches do not obstruct the rotation of the blades connected to the respective branches. A similar distance can be maintained between branches at the third level L3 and fourth level L4.

The branches at a particular level are equiangular from each other. For example, when the eco-tree 100 includes four branches at each level, the angle between branches (e.g., branches BR1-BR4 at the first level L1) can be approximately 90° to maintain a symmetric construction. Such symmetric construction enables the eco-tree 100 to harness energy from the wind flowing in different direction without adjusting the orientation of the blades (e.g., B1-B3).

The branches (e.g., branches BR1-BR4) can be removably attached to the center shaft 110 via a fastening method such as threaded joints. The center shaft 110 can include internally threaded holes that can receive the externally threaded branches. Such a removable construction of the branches provides ease of transportation, assembly, maintenance and repairs. Furthermore, one branch can be removed for repair without removing the other branches. As such, the eco-tree 100 can continue to produce energy from the wind and purify the air, however, at a lower efficiency, while the repairs or maintenance is being done.

It should be noted, however, that the scope of the present disclosure is not limited to four branches and the number of branches can vary, as can be understood by a person skilled in the art. For example, the eco-tree 100 can include three branches at the first level L1 with an angle between the branches being approximately 120°. Furthermore, the number of branches at each level can vary. For example, four branches can be included at the first level, three branches at the second level L2, two branches at the third level L3, and no branch at the fourth level L4. When no branch is provided, the blade (e.g., blade B25) can be connected directly to the center shaft 110.

Each of the branches can include a plurality of blades. In one example, the length of the branch can vary based on the number of blades supported by the branches. For example, the length of the branch BR1 at the first level L1 is longer than the length of the branch BR5 at second level L2. Further, the branch BR1 supports three blades B1, B2, and B3, while the branch BR5 supports two blades.

The branch BR1 includes three blades B1, B2, and B3 spread along the length of the branch BR1. In one example, the blades B1, B2, B3 can be arranged equidistant from each other. Each blade is configured to rotate about a vertical axis and connected to a micro-turbine, further illustrated for blade B1 of branch BR1 in FIG. 2.

FIG. 2 is a cross-section of the eco-tree 100 illustrating internal details according to an exemplary embodiment of the present disclosure. In FIG. 2, the blade 131 includes a shaft 305 rotatably connected to a micro-turbine 200. The micro-turbine includes a gear box 210 and a generator 215. The gear box 210 can be a planetary gear box configured to receive a rotational input from the shaft 305 and increase a rotational speed of the shaft 305 at the output of the gear box 210. The gear box 210 can further transmit the rotational output to the generator 215. The generator 215 can then convert the rotation of the blade B1, received via the gear box 210, to electric energy. The generator 215 can transmit the electric energy produced from the blade B1 rotation to the step-up transformer 230 via electrically conducting wires 220.

Similarly, each blade of the eco-tree 100 can be connected to a micro-turbine that converts the wind energy into electric energy. The electric energy produced by each micro-turbine can be further passed to a transformer to regulate the voltage. Such regulated voltage can be used by different electrical appliances such as home appliances, street lights, signals, or other machines that run on electric energy.

Figure 3:
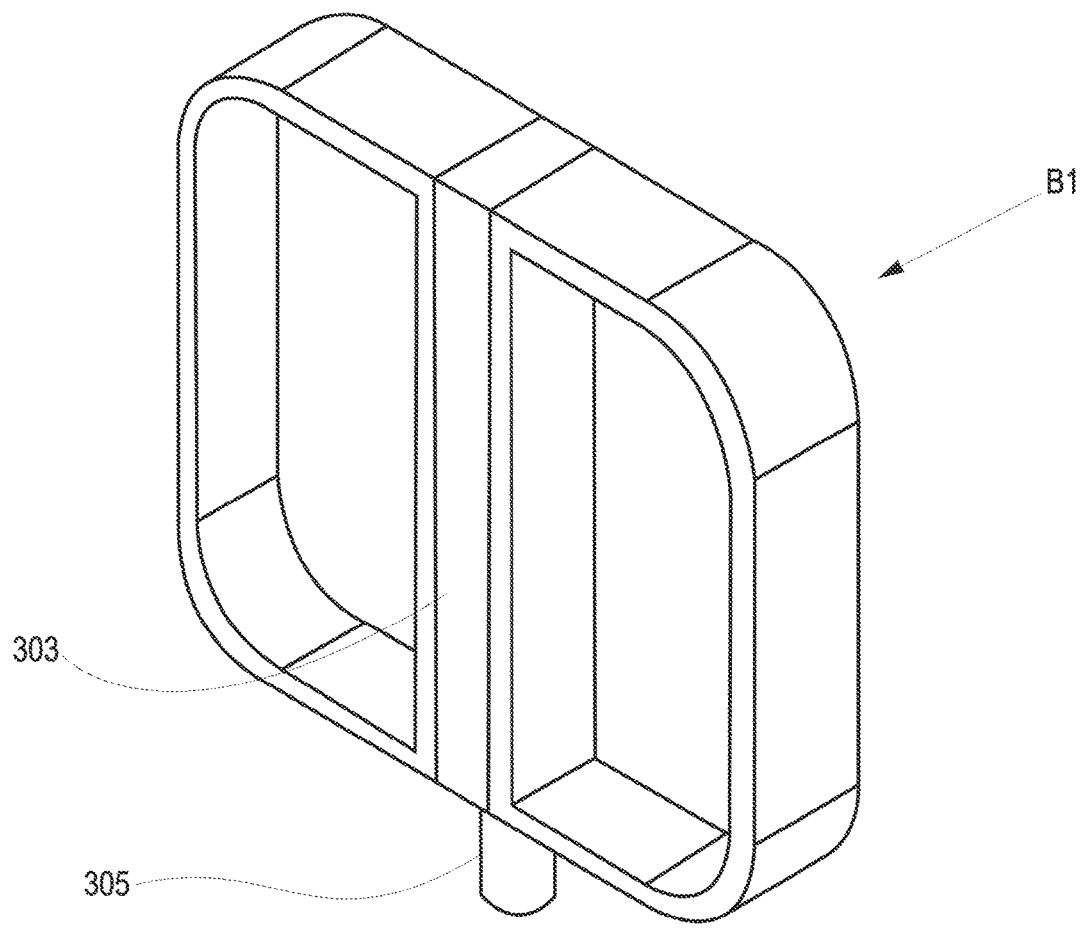
FIG. 3 illustrates a blade of the eco-tree according to an exemplary embodiment of the present disclosure.

FIG. 3 illustrates geometry of the blade B1 of the eco-tree 100 according to an exemplary embodiment of the present disclosure. The blade B1 includes a first pocket 301, a second pocket 302, a partition 303, and the shaft 305. The blade B1 can be made of a substantially rectangular frame having the partition 303 at a center of the rectangle and the shaft 305 extending from the partition 303 outside a frame of the rectangle. The partition 303 separates the first pocket 301 from the second pocket 302. Furtheimore, the rectangular frame can have rounded edges to create a laminar flow around the blades B1. Such laminar flow in turn improves the efficiency of energy generation. In addition, the laminar flow may be desirable between two different blades (e.g., B1 and B2), so rotation of one blade (e.g., B1) does not interfere with the rotation of an adjacent blade (e.g., B2).

Figure 4:
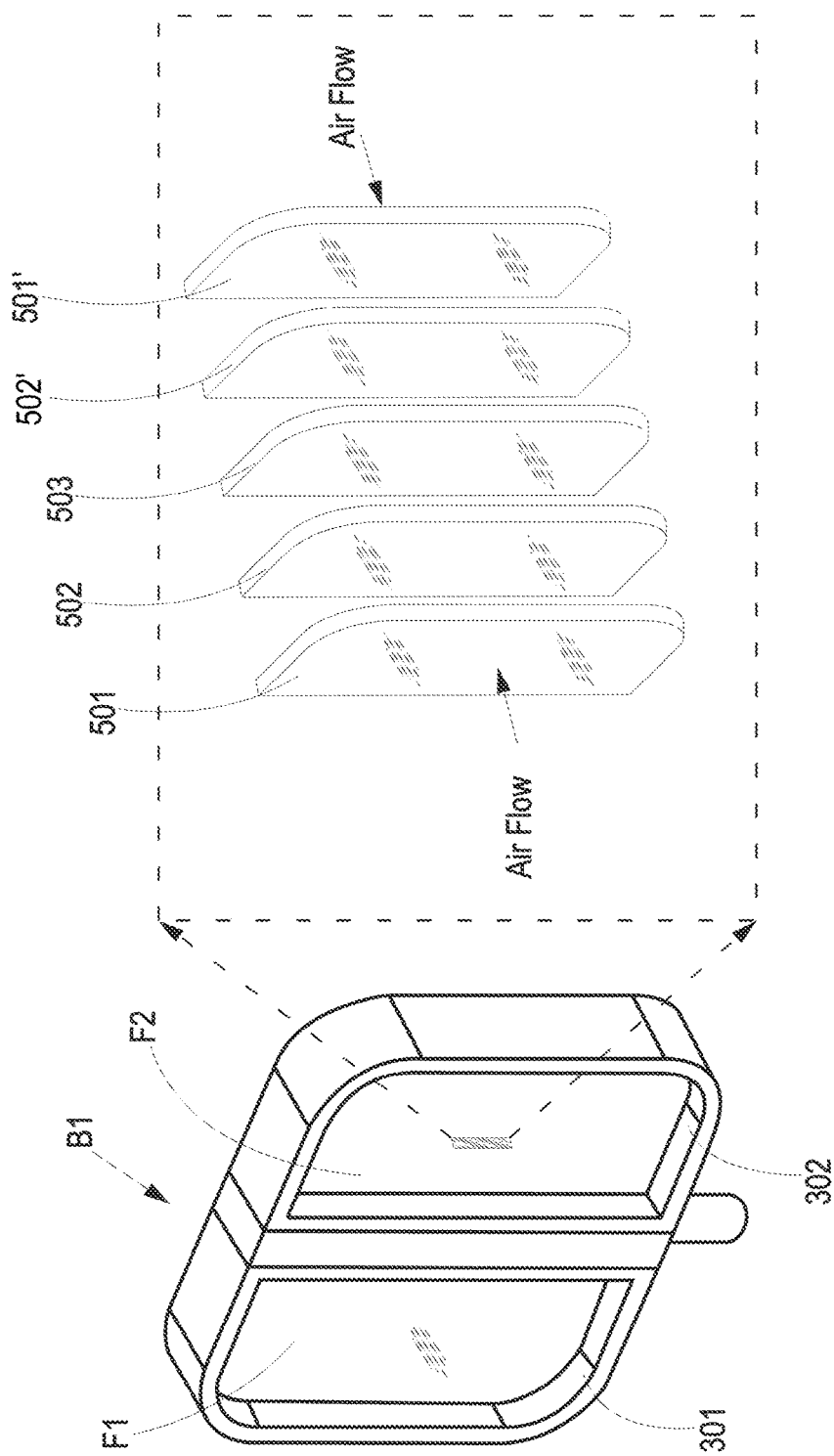
FIG. 4 illustrates a cross-section of the blade including an air filter according to an exemplary embodiment of the present disclosure.

The first pocket 301 and the second pocket 302 can be configured to receive air filters F1 and F2 (in FIG. 4) or other flat sheet. In FIG. 4, the air filters F1 and F2, or the flat sheet can block the wind causing the rotation of the blade B1 about the shaft 305. The air filter F1 and F2 can be removably attached within the first pocket 301 and the second pocket 302, thus allowing easy cleaning, maintenance and/or replacements of the air filters F1 and/or F2. The filters F1 and F2 can be substantially similar in composition and function.

All the blades of the eco-tree 100 can have a similar structure and configuration as the blade B1. However, the present disclosure is not limited to the above blade configuration or geometric shape. The blade geometry and configuration can be modified, as can be understood by a person skilled in the art. For example, the shape of the blade can oval or circular. In another example, blades at a top of the eco-tree 100 can be larger in size than blades at a bottom part of the eco-tree 100.

FIG. 4 also illustrates a cross-section of the air filter F2 installed within the blade B1 according to an exemplary embodiment of the present disclosure. The air filter F2 includes a plurality of filters assembled to form the air filter F2. The filter F2 includes two A-type filters 501 and 501', two B-type filters 502 and 502' and a C-type filter 503. The C-type filter 503 is sandwiched between the two B-type filters 502 and 502' and the B-type filters are further sandwiched between the A-type filters 501 and 501'. Thus, the air filter F2 has a symmetric construction about the C-type filter allowing the air filter F2 to filter air flowing from either side (front or back) of the blade B1.

The A-type filters 501 and 501' can be any filter that collects coarse particles of size greater than approximately 0.1 mm. The B-type filters 502 and 502' can be any filter that can collect respirable and airborne particles of size less than approximately 0.1 micron and up to 0.1 mm. The C-type filter 503 can be any adsorbent that can collect volatile organic compounds. The A-type and the B-type filters can be made of durable and resistant materials such as polypropylene fibers. These filters are designed for the removal of airborne particles and pollutants such as pollen and dust. The C-type filter could be an adsorbent acting as activated carbon for the removal of gaseous pollutants, such as volatile compounds (VOCs, BTEX) produced from incomplete combustion of fuel in automobile engines or fuel evaporation during car fueling. The filters can work up to 5 months (4000 hours) when used continuously 24 hours per day.

Thus, the filters F2 (and F1) can progressively captures smaller and smaller particles as the air flows from the A-type filter layer to the B-type filter layer and finally through the C-type filter layer.

The present invention is not limited to the above filter-type. The filter F2 can be any other filter adapted to fit within the blades of the eco-tree 100, as can be understood by a person skilled in the art.

Figure 5:
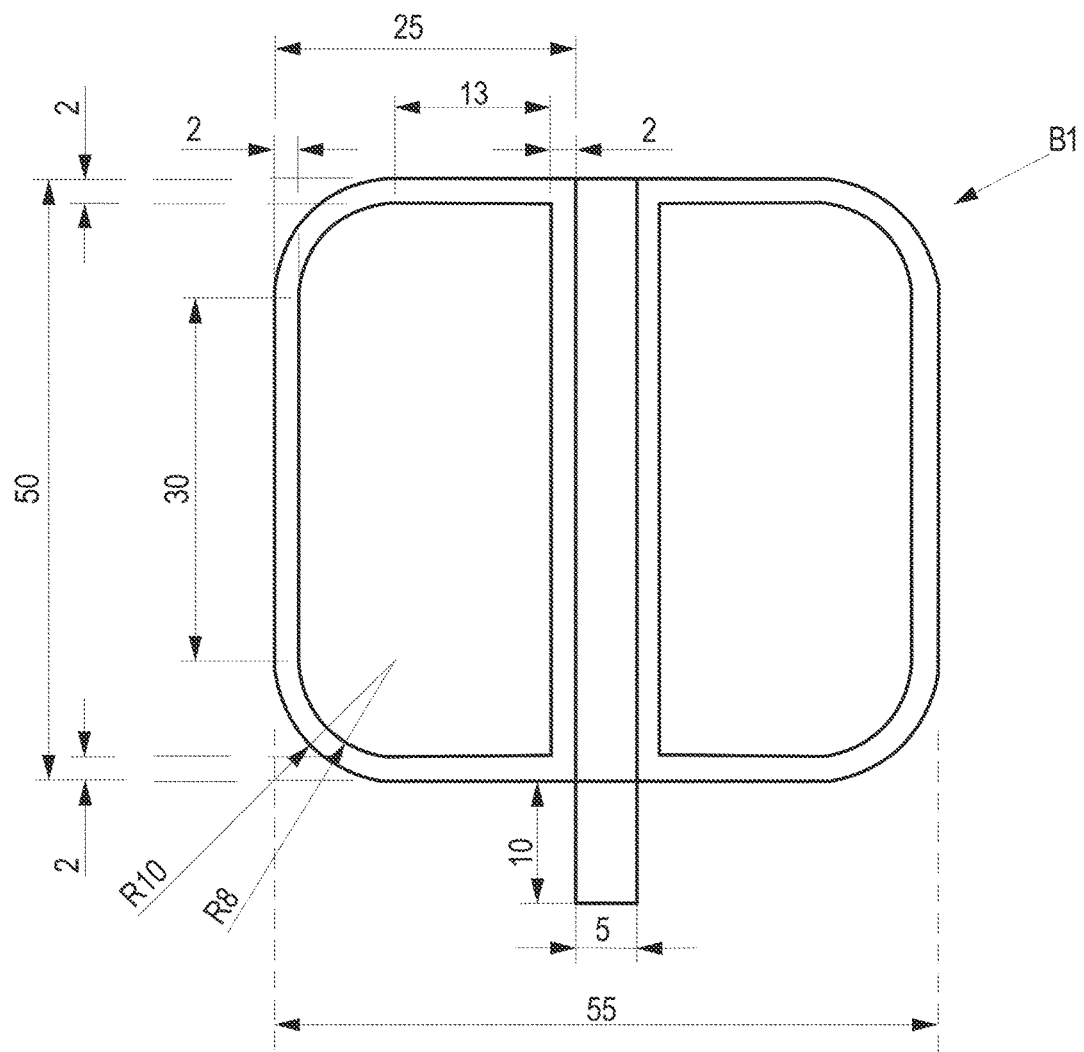
FIG. 5 is a front view of the blade with exemplary dimensions of the blade according to an exemplary embodiment of the present disclosure.

FIG. 5 is a front view of the blade B1 with exemplary dimensions of the blade according to an exemplary embodiment of the present disclosure. The frame of the blade B1 can be approximately 50 mm long and approximately 55 mm wide with curved or chamfered edges to provide aerodynamic advantage. Further, the frame can be 2 mm thick. The shaft 305 and the center partition 303 can be approximately 5 mm. The shaft 305 can be approximately 10 mm long. The first pocket 301 (and the second pocket 302) can be approximately 46 mm long and approximately 21 mm wide.

The eco-tree 100 has several advantages due to its small size and multiple functionality. The eco-tree 100 does not require external electric power source to purify air. Furthermore, the eco-tree 100 can be produce electric energy from the renewable wind energy. The eco-tree 100 can be small enough to operate very harsh weather condition as well as crowded cities. For example, in cities, where trees are cut down and create pollen issues, several eco-trees 100 can be installed. The energy produced by the eco-trees 100 can be used to power the street lights, road signs, charge external devices or supply power to other electrical devices. Particularly, the eco-trees 100 can be useful at night when solar power devices may not operate.

While certain embodiments have been described, these embodiments have been presented by way of example only, and are not intended to limit the scope of the present disclosure. Indeed, the novel apparatuses described herein can be embodied in a variety of other forms; furthermore, various omissions, substitutions and changes in the form of the apparatuses described herein can be made without departing from the spirit of the present disclosures. The accompanying claims and their equivalents are intended to cover such forms or modifications as would fall within the scope and spirit of the present disclosure.

What is claimed is:

1. An apparatus for wind energy production and air purification comprising:
   a vertically mounted center shaft;
   a plurality of branches connected horizontally to the center shaft along a length of the center shaft to form different levels of branches;
   a plurality of blades rotatably connected to each branch of the plurality of branches, at least one of the blades being configured to hold one or more air filters; and
   a micro-turbine rotatably connected to each blade of the plurality of blades, wherein each blade of the plurality of blades is configured to rotate in response to air received at the plurality of blades thereby producing electric energy via rotation of the respective micro-turbines and the one or more air filters, the one or more air filters being configured to filter the air blowing at the plurality of blades.

2. The apparatus according to claim 1, wherein the plurality of branches are equiangular from each other.

3. The apparatus according to claim 1, wherein the length of branches at a first level is greater than the length of branches at a second level.

4. The apparatus according to claim 3, wherein a number of blades on the branches at the first level is greater than a number of blades on the branches at the second level.

5. The apparatus according to claim 1, wherein the branches are hollow and carry wires electrically connecting the micro-turbines to a step-up transformer.

6. The apparatus according to claim 1, wherein each blade of the plurality of blades includes
   a frame with a first pocket and a second pocket,
   a partition separating the first pocket and the second pocket, and
   a shaft connected to the partition and extending outside the frame.

7. The apparatus according to claim 6, wherein each blade of the plurality of blades has a rectangular shape with rounded edges.

8. The apparatus according to claim 7, wherein the first pocket and the second pocket each hold a respective air filter.

9. The apparatus according to claim 8, wherein the air filters include:
   at least two A-type filters to collect coarse particles in the air flowing through the blades, and
   at least two B-type filters to collect fine particles in the air flowing through the blades.

10. The apparatus according to claim 9, wherein the air filters further include
    a C-type filter to absorb organic substances, wherein the C-type filter is sandwiched between the B-type filters and the at least two B-type filters are sandwiched between the A-type filters.

11. An apparatus for wind energy production and air purification comprising:
    a vertically mounted center shaft;
    a plurality of branches connected horizontally to the center shaft along a length of the center shaft to form different levels of branches;

a plurality of blades rotatably connected to each branch of the plurality of branches, at least one of the blades including
- a frame with a first pocket and a second pocket configured to hold one or more air filters,
- a partition separating the first pocket and the second pocket, and
- a shaft connected to the partition and extending outside the frame; and a micro-turbine rotatably connected to each blade of the plurality of blades, wherein each blade of the plurality of blades is configured to rotate in response to air received at the plurality of blades thereby producing electric energy via rotation of the respective micro-turbines and the one or more air filters, the one or more air filters being configured to filter the air blowing at the plurality of blades.

12. The apparatus according to claim 11, wherein the plurality of branches are equiangular from each other creating a symmetric construction.

13. The apparatus according to claim 11, wherein the length of the branches at a first level is greater than the length of the branches at a second level.

14. The apparatus according to claim 13, wherein a number of blades on the branches at the first level is greater than a number of blades on the branches at the second level.

15. The apparatus according to claim 11, wherein the branches are hollow and carry wires electrically connecting the micro-turbines to a step-up transformer.

16. The apparatus according to claim 11, wherein each blade of the plurality of blades has a rectangular shape with rounded edges.

17. The apparatus according to claim 11, wherein the first pocket and the second pocket each hold a respective air filter.

18. The apparatus according to claim 17, wherein the air filters include
- at least two A-type filter to collect coarse particles in the air flowing through the blades, and
- at least two B-type filter to collect fine particles in the air flowing through the blades.

19. The apparatus according to claim 18, wherein the air filters further includes
- a C-type filter to absorb organic substances, wherein the C-type filter is sandwiched between the B-type filters and the at least two B-type filters are further sandwiched between the A-type filters.

* * * * *